Sept. 6, 1949.   W. C. GOSS   2,480,851
METHOD FOR RAPID MANUFACTURE OF SHEET LUMBER
Filed Feb. 5, 1947

INVENTOR
WORTH C. GOSS
BY
Cook + Robinson
ATTORNEYS

Patented Sept. 6, 1949

2,480,851

UNITED STATES PATENT OFFICE 2,480,851

METHOD FOR RAPID MANUFACTURE OF SHEET LUMBER

Worth C. Goss, Seattle, Wash., assignor, by direct and mesne assignments, to United States Sheetwood Company, Seattle, Wash., a corporation of Delaware Application February 5, 1947, Serial No. 726,480

6 Claims. (Cl. 18—47.5)

This invention relates to what is known in the lumber industry as "sheet lumber" and it has reference more particularly to improvements in methods of manufacturing sheet lumber from fiberized, ligno-cellulosic material by forming the fibers into a matted layer or pad that is then compressed, and the fibers thereof coalesced or bonded under the action of heat and pressure such as might be obtained, for example, by subjecting the matted layer of material to compression in a hot platen press, or by passing it between hot press rollers and causing it to be subjected to heat and pressure thereby.

The present invention relates more specifically to an improved method for the high speed, commercial manufacture of sheet lumber of that kind above identified, and particularly to any one or all of the various kinds disclosed in my several co-pending applications that have been filed, respectively, under Serial Nos. 637,107; 665,891, now abandoned; 680,838; 668,590; and also it relates to a method applicable for the production of lumber in continuous sheet form as described and illustrated in my co-pending application filed under Serial No. 697,365. However, it is to be understood that the present method is also applicable for the manufacture of various products, other than those classified as lumber, comprising fiberized, ligno-cellulosic materials that have been compressed and the fibers coalesced by an application of heat and pressure.

Furthermore, the present method anticipates that the ligno-cellulosic fibers may be prepared from wood, or the like, in various ways other than by grinding, for example, by exploding the wood pieces with steam in accordance with the teachings found in the various patents issued to Mason and especially as set forth in U. S. Patents Nos. 1,663,504 and 1,663,505, wherein it is taught also that wet wood fibers are used for preparing the pads or mats from which the boards are formed and that the matted layers of fiberized materials, after being prepared as mats are pressed and the fibers coalesced by the conjoint application of heat and pressure and that the pressure is retained on the sheet under treatment until it has been thoroughly and completely dried. In the present process Mason's fiber would be used dry.

Heretofore, in the making of sheet lumber by the matting and pressing of wet, fiberized, ligno-cellulosic materials into dense, non-expandable sheets, the pressing interval, that is, the time interval required for the pressing of a matted layer of fibers and the coalescing of the fibers to produce a substantially non-expandable sheet that could be removed from the press without danger of its being split or disrupted by reason of internal steam pressure, has been determined by various factors including, for example, the platen temperatures, the pressure used, the rate of penetration of heat from the pressing elements into the wet pad or layer of material; the extent of drying required before the fibers coalesce sufficiently that internal steam pressure would not operate to disrupt the sheet upon the removal of platen pressure, and the thickness of the finished sheet. A very material prolongation of the drying period has been required heretofore by reason of the fact that quite wet fibers have been used and these will not unite into a solid, bonded sheet until quite dry.

It has been a common practise also in the making of sheet lumber to prepare the fibers from wet wood, then to prepare the pads from this quite wet, fibrated material and to subject them to heat and pressure while containing as much as from 25% to 90% moisture content based on weight of dry fibers. It became necessary, then, not only to bring the layer of material to the necessary, coalescing heat all the way through in order to insure the proper bonding of the fibers at the center of the board, but also to retain the board under the consolidating pressure after this plasticizing action until the board was substantially dry, or at least until it had cooled off, in order to insure the integrity of the bond and prevent disintegration of the board upon the removal of platen pressure therefrom. The relatively long heating up period, due to the practise of using fibers of high moisture content in preparing the fiber blanket; the long pressing period for the drying out operation, and the inadvisability of trying to speed up drying out of the sheet by any material increasing of the press platen temperatures, has rather definitely established the pressing period for a finished sheet of material one-fourth inch thick, within a range of twenty to forty minutes, and this increases materially with any increase of sheet thickness.

In view of the foregoing explanatory matter, it has been the principal object of this invention to provide an improved method of manufacturing sheet lumber from fibrated ligno-cellulosic materials, whereby the pressing period can be very materially reduced without detriment to the finished product. Furthermore, a method whereby the differential in pressing time as heretofore required as between sheets of different thickness, becomes practically negligible.

It is also an object of this invention to provide a novel method of manufacture whereby the lumber sheets can be made from comparatively dry fibrated material, that is, material of not more than 25% moisture content, as distinguished from the usually used material of from 25% to 90% moisture content and which method makes possible the substantially instantaneous heating of the prepared pads of fibrated material throughout their entire thicknesses by high pressure steam prior to and during the compressing action, thus to effect a complete plasticizing of the individual fibers that will serve to bond the board during the application of consolidating pressure.

It is also an object of the invention to provide a method adapted to use of dry fibers and the almost instant and individual heating of all fibers of the pad prior to any forming pressures in the press, by use of high pressure steam which, aside from its heating effect, will supply the required moisture to the fibers to insure the softening of the lignin when the heat becomes effective.

When a plastic is used as in my application Serial No. 637,107, to coat the fibers it will melt under the action of the heat of the steam. The steam pressure used should cause liquefaction of what ever plastic has been mixed with the fibers.

Another object of the invention is to provide a method of manufacture whereby the long drying or cooling period after plasticizing the fibers is eliminated and the complete and effective coalescing of the fibers effected in a few seconds.

Other objects of the invention reside in the various individual steps of the method and in their sequences of use in the method.

Still other objects of the invention reside in the provision of a novel machine, or mechanisms, whereby the present method may be practised.

Finally, it is an object to provide a new and novel sheet of lumber as an article of manufacture.

In general, the present method as used for the making of sheet lumber in dimensions comparable to those of present day plywood panels, and the like, contemplates forming a matted layer, pad or blanket, of the selected, fibrated ligno-cellulosic material, to a suitable thickness by sifting the fibers through a screen or in any other suitable manner. Prior to sifting, the fibers would be dried to from zero to 25% moisture content. Then, for practical handling purposes, it is desirable that the matted layer of fibers be somewhat condensed, for example, by mechanical pressure, thus to reduce it to a thickness of from two to three inches, or to any other thickness that might be necessary or most practical to give the pad handling strength, and depending upon the thickness of the finished product but still leaving it in a rather loose porous condition. The somewhat condensed pad is then placed in readiness for compression, for example, it might be placed upon a smooth, travelling belt or plate preparatory to being located in a press, or it might be placed directly upon the smooth top surface of the lower platen of a hot press as used in plywood manufacture. Then one or more wire screens of about 20 meshes per inch are placed on top of the pad, as is customary in the heretofore used methods of making such sheets, to permit escape of steam during the pressing operation.

The pad as thus prepared, is then located in readiness for compression, within a closed chamber which may or may not inclose the entire press therein but prior to the pad pressing operation, high pressure steam is admitted into the chamber and this pressure is retained for a predetermined period of time, which might vary somewhat with the thickness and character of the pad but always of sufficient length that the high pressure steam will penetrate the pads to effectively and thoroughly heat the entire body of fibrous material. This operation normally requires but a few seconds, for it will be understood that, under the pressure employed, which for most practical results should be within a range of from 50 to 1000 pounds per square inch, the steam almost instantly penetrates throughout the pad of fibrated material, causing it to be thoroughly and uniformly heated to the core and by reason of its intimate contact with each and all the individual fibers thereof to cause them to be more or less plasticized. Thus, it is that the thickness of the pad has no particular bearing on heating time, and this is not materially or even noticeably affected by moisture content of the fibers.

After this application of high pressure steam has thoroughly heated the pad, and the individual fibers have been rendered partially or entirely plastic, and while the steam pressure is still on, the pad compressed, either by pressing it between coacting rollers, or between the press platens heated to an effective temperature and under the plasticizing action of the steam and mechanical pressure, the fiberized material is caused to flow into a condensed mass and the fibers effectively coalesce to a sheet of any desired density, as determined by platen pressure. Any steam that is in the material or that may be generated by the heat, is expelled from the sheet through the screen protected surface.

In order to effectively bond the fibers together under heat and pressure, the lignin therein must be softened or liquified. This is best accomplished when the fibers contain about 25% to 30% moisture content. Since I employ practically dry fibers, of about 16% moisture content in making the pad, it is desired here to explain that when the high pressure steam is introduced into the very porous pad, it at first is condensed on the fibers and in this way the fibers will receive the necessary additional moisture to insure the softening or liquification of lignin and the satisfactory bonding action under pressure. Upon cooling, the lignin solidifies and insures the integrity and permanency of the bond.

Immediately following the pressing period, vacuum is applied to the chamber and moisture in the sheet is flashed into steam and quickly removed therefrom by the vacuum. In this way the sheet is almost instantly cooled to a temperature below 212° F. and therefore there will be no disrupting pressure confined in the sheet and the press may be opened immediately, for removal of the sheet with safety. Upon cooling, the lignin and/or plastic solidifies by reason of water removal, and the sheet becomes tough and strong. If a plain thermoplastic substance is used it sets when cooled.

In order to carry out the present method economically and expeditiously, I can employ mechanism of the type of that shown diagrammatically in the accompanying drawings wherein—

Figure 3:
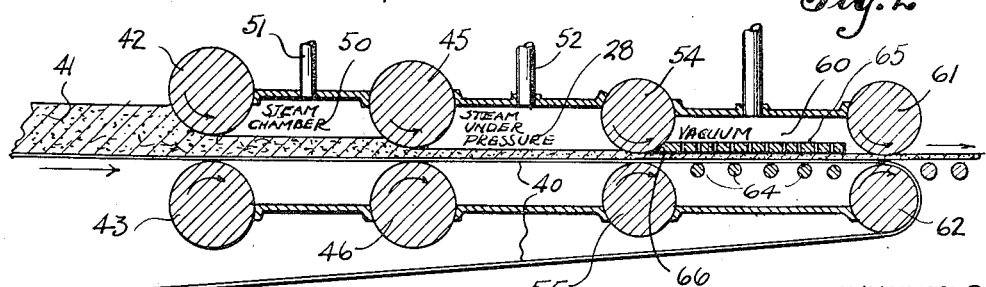

Fig. 3 diagrammatically illustrates, in vertical section, a roll type press whereby the present method may be practised to produce continuous sheets of material.

Referring more in detail to the drawings—

Figure 1:
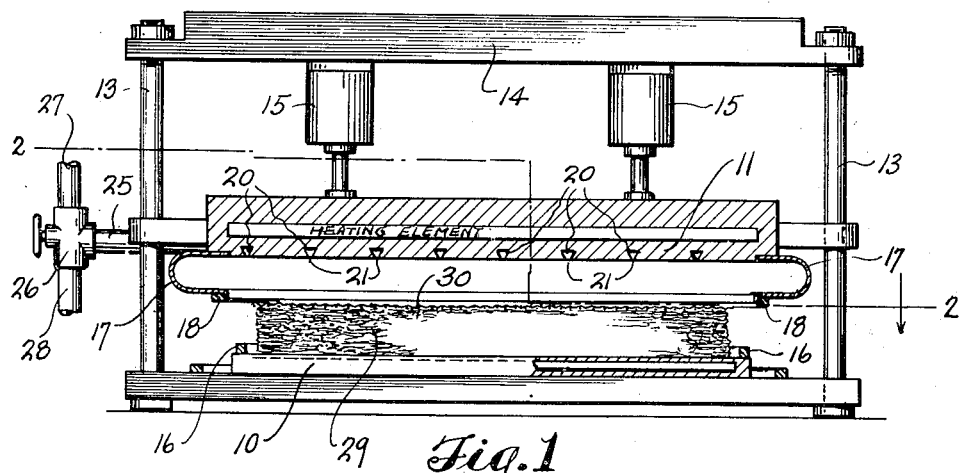
Fig. 1 is a cross-sectional view, taken in a vertical plane, of a platen type press in which sheet lumber may be made by the present method.
Figure 2:
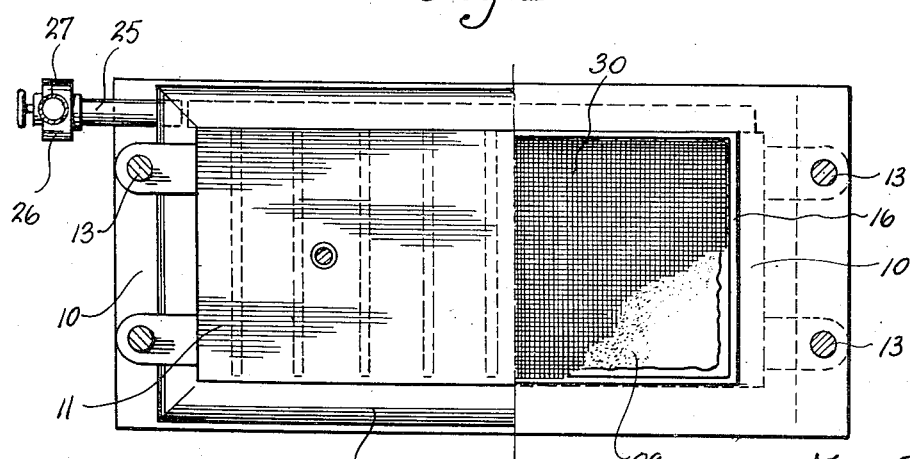
Fig. 2 is a horizontally sectional view of the press, as seen on the line 2—2 in Fig. 1.

In Figs. 1 and 2, 10 designates the lower platen, of a press and 11 the upper platen, both platens being equipped to be heated by steam, electricity or in any other suitable manner, to the necessary or a desired temperature for the present operation. Heating means such as now generally used in platen presses of the kinds employed in manufacturing plywood can be used quite satisfactorily in this press and also the same devices, as ordinarily used in plywood presses might be employed for the control and operation of the press except as modified to meet the present requirements.

The upper platen 11 is here shown as being vertically guided in travel by shafts 13 that are fixed to opposite sides of the lower platen and at their upper ends carry an upper frame structure 14. It is shown also that the upper platen is adapted to be actuated toward the lower platen for a pressing operation by hydraulic jacks, indicated generally by reference numerals 15—15 and fixed to frame 14. The lower platen 10 has a smooth, flat top surface upon which the sheet is formed and, about its periphery, this platen is equipped with an upstanding metal flange or bead 16 designed to establish the thickness of the finished sheet. The upper platen is equipped with a yieldable joint sealing flange 17 entirely about its periphery, that will engage with the surface of platen 10 outside of the bead 16 as the platen 11 is brought to position for the pressing operation. This flange seals the space between the platens and thus provides the closed chamber in which the pad is subjected to the treatment of high pressure steam. With the downward travel of the platen 11, this flange yields but retains the seal. Preferably the flange 17 is U-shaped in cross section and has a rubber gasket 18 fixed thereto to engage the platen 10.

The under surface of the upper platen is formed with a plurality of rather closely located, parallel cross channels 20, each opening throughout its entire length to the bottom surface of the platen through a very narrow slit 21. All channels 20 are closed at one end and at their other ends open into a manifold 24 that is fixed to the platen and which has a flexible pipe connection 25 leading to a valve structure 26 to which a source of high pressure steam, indicated by a pipe 27, is attached. Also, the valve has connection with a source of vacuum as indicated by a pipe 28. The valve structure is of such character that it may be manually adjusted for admitting the high pressure steam to the manifold or for connecting the manifold with vacuum. Also, both the steam and vacuum may be closed off and the manifold opened to atmosphere.

In the making of a sheet of pressed lumber by means of the press disclosed in Figs. 1 and 2, it is preferred that a pad of fibrated material first be prepared outside of the press, for example, by sifting the selected ligno-cellulosic fibers onto a flat base. The pad would then be given a preliminary pressing operation, reducing it from a light fluffy mass of from ten or more inches thick, for a half-inch board a pad of about two to three inches thick; this being to give it strength for handling and a practical handling thickness. The partially consolidated sheet designated at 29 is then placed upon the lower press platen as shown and a screen, or screens as shown at 30, is applied thereover. Then the upper press platen is brought down by means of the jacks 15—15 bringing the flange 17 into sealed contact with the lower platen, thus forming a sealed chamber within which the blanket of material is contained, but still in a lightly pressed condition.

Before final pressure is applied to the pad after the chamber has been sealed, the valve 26 is adjusted for the admission, through the channels 20, and slits 21, of high pressure steam into the chamber. It has been found practical to apply steam to the chamber at a pressure of from 10 to 1000 pounds per square inch and to retain this for a predetermined time according to the character of the product being made. It will be readily understood that the high pressure steam instantly penetrates throughout the loosely compacted, porous pad of material, bringing all the fibers almost instantly up to the heat of the steam thus rendering them more or less plastic. The steam pressure of from 10 to 1000 pounds per square inch, is retained in the chamber for about 15 seconds, during which time the dry material takes on the necessary additional moisture, and the lignins and/or plastic become liquified. Then the upper platen is moved downwardly against the pad or fibrated material with condensing pressure and causes the coalescing of the fibers. It has been demonstrated that under a pressure of from 100 to 1000 pounds per square inch, applied by the platens which are heated to from 220° F. to 550° F., the fibers will virtually and almost instantly flow together. The wide range of temperatures and pressures used are to take care of the various types of board products and various uses to which they are to be put. Steam that is created in the sheet in this pressing operation may escape through the screen and channels provided in the upper press platen and may be exhausted through the manifold and valve structure to atmosphere. After a pressing period of approximately 15 seconds, the steam pressure is released and vacuum is applied through the valve, manifold, steam channels and screen, thus extracting all steam from the sheet and also, by reason of this extraction, causing the temperature of the sheet to be immediately reduced below the degree of temperature of steam at atmospheric pressure so that there will be no further creation of the steam pressure in the sheet and no disrupting action possible upon the opening of the platens. The cooling instantly causes solidification of the lignin and/or plastic bond and the sheet becomes non-expandable.

The platens may then be opened apart and the sheet removed from the press. The entire operation of compressing the sheets in the press is usually one minute or less, regardless of thickness.

In Fig. 3 I have diagrammatically illustrated a roll type press adapted for carrying out the present method in a continuous operation. In this machine I provide a continuous, horizontally travelling metal belt 40 on which a sifted layer 41 of the selected fibers are conveyed between upper and lower rollers 42 and 43 for condensing the pad. The partially condensed portion 44 of the pad is then advanced, on the belt, between heated press rolls, 45 and 46. Plates 47 and 48 that extend between the upper rollers 42–45 and lower rollers 43–46, respectively, serve with the rollers to enclose a chamber 50 in which high pressure steam is admitted by pipe 51 for the fiber plasticizing action.

After passing between the rolls 45 and 46, the sheet is advanced on the belt 40 between another set of hot, pressing rolls 54 and 55, and there are plates 56 and 57 extended between the upper rolls 45–54 and lower rolls 46–55, respectively, to coact therewith to define a second steam chamber 58 in which high pressure steam may be admitted through pipe 59, at the same or different pressure than in chamber 50. After the consolidated sheet passes the hot press rolls 54 and 55, it is carried by the belt through a vacuum chamber 60 and delivered therefrom between rolls 61 and 62. Within the chamber 60 the belt is carried on cross rolls 64 and overlying the sheet is a flat perforated plate 65 having an elongated nose 66 extended into close contact with the roller 54 at the line of emergence of the sheet so that the vacuum in chamber 60 will not cause an outward swelling of the sheet at this point. The vacuum in chamber 60 is maintained by pipe connection 66 leading to a source of vacuum, and the effect of the vacuum in this chamber is the same as previously described in connection with the machine of Fig. 1.

It is believed of significance to point out that while it is now considered most practical to prepare the fibers from wet wood, it is advantageous, as has been explained herein, to reduce their moisture content to from zero to 25% prior to subjecting the pad to the consolidating heat. This drying of the wood fibers can be done most economically prior to forming the pad, and in this way the long and expensive operation of drying the pad in the press is avoided.

It is also believed of significance to point out that in the usual operation of compressing, of the fiber sheets, the heat is all transmitted to the layer of material by contact with the press platens and travels slowly from the outside surfaces of the wet sheet to the center. Aside from the slowness of heating, the necessary heat to evaporate the water contained in the fiber pad takes an extremely long time to flow from the platens. This is especially the case where sheets of more than one-fourth inch thickness are made. The present use of steam under pressure not only heats, but provides almost instant penetration of heat uniformly throughout the sheet of material.

Steam pressures may be varied to suit the work at hand or kind or type of board being made, as may also the pressure and heat of platens be varied as desired or required under any special circumstances.

While I have indicated the use of saturated or ordinary steam under pressure, this may also be a superheated steam.

In the foregoing description, I have recited the making of a board from a fiberized, ligno-cellulosic material. However, in several of my copending applications, I have disclosed use with the fibrated material of a certain bonding agent derived from decayed wood. It is to be understood that the present method is applicable for use in the making of boards from wood fibers either with or without the bonding agent, and that it can be used successfully where bonding agents other than those which I have specifically mentioned in my copending application, Serial No. 680,838 are used. The gist of my invention resides in the method as applied to the making of boards upon a material that is predominately fibers and is not to be restricted in any way due to absence or use of any other agent for bonding or other purposes. Therefore, when I refer to a fiberized ligno-cellulosic material, I mean the wood fibers used with or without other materials or agents. In referring to a matted layer or pad of ligno-cellulosic fibers, I refer to any pad or sheet that has been made from fibers, but which is sufficiently porous or open for the quick penetration of steam under pressure throughout the pad for intimate heating of fibers with plasticizing action therefrom. For example, a soft insulating board originally formed by laying fibers into a mat in water, then forming the mat of fibers into a low density board either by passing between rollers and drying or by forming in a platen press wherein stops are employed. The density of such a board is usually about .33. The blank so formed may be almost instantly converted to a dense strong hard board by the present process, of mechanical pressure in an atmosphere of high pressure steam.

It is anticipated, in my process, that various types of natural or synthetic plastics might be used to coat the fibers. Plain cellulose fiber may be used when a bonding agent is employed. Plastic coated glass or asbestos fibers form excellent boards as long as the plastic used will soften or liquefy under the action of the steam.

Even thermo-setting resins such as phenolformaldehyde may be mixed with fibers and can be so adjusted chemically that they will set under the action of the steam. Thermo-melting plastics such as rosin or purified lignin produced from pulp liquor may be used to produce boards from wood pulp or ground wood fiber. Vegetable fiber from cornstalks or bagasse from sugar cane stalks may be used either with or without added plastic substances. An excellent plastic for use in the process is produced by high temperature hydrolysis of wood or vegetable fiber in water or steam. During the hydrolysis, part of the bonding substance of the wood is converted to meltable compounds, which cause solid bonding of a board made from the hydrolyzed fiber in the present process. Therefore, in the claims the term "ligno-cellulose" is used to denote any class of fiber whatsoever as long as a bond is obtained in the cooled board.

It should be understood that, in general, the products of the present invention are pressed to a density at which some porosity exists throughout the board so that the contained water may flash to steam and escape when the steam pressure is released.

The main advantages of the present invention reside in the fact that dry fibers may be used in making the pad and thus the heating up and drying out of the pad in the press is materially reduced, making possible the consolidation and removal of a sheet from a platen type press within a one minute interval instead of the 20 to 40 minute period heretofore required. Also the almost instant penetration of steam entirely through the pad, prior to consolidating pressure being applied, makes possible the individual plasticizing action on the fibers, and insures the liquification or softening of lignin therein or plastic thereon and a complete, uniform and non-expandable bonding of the sheet.

Various other advantages reside in the manufacturing expediency that results in lower production costs.

It should be understood also, that the process applies to the bonding of moulded articles such as raised decoration wall panels, toilet seats, figurines, etc.

Having thus described my invention, what I claim is new therein and desire to secure by Letters Patent is:

1. The method of making lumber products from wood fibers, comprising forming a porous matted pad of said fibers, subjecting the pad to an atmosphere of high temperature steam under pressure to effect the complete penetration of the pad by the steam and the heat plasticizing of its fibers, compressing the pad by platen pressure to effect the coalescing of the plasticized fibers and subjecting the compressed pad to vacuum, while still held under platen pressure, and retaining said vacuum until the pad has been cooled thereby below steam generating temperature.

2. The method of making a board of the character described from ligno-cellulosic fibers, comprising laying down the fibers to form a porous pad, subjecting the pad to an atmosphere of high temperature steam under pressure to effect complete penetration of the pad by the steam and the heat plasticizing of its fibers, compressing the pad between press platens to effect the coalescing of its plasticized fibers while still subjected to the atmosphere of high temperature steam, venting from the pad steam that is generated therein while being compressed, removing the atmosphere of high temperature steam from about the pad and subjecting the compressed pad, while still maintained under pressure, to vacuum, and retaining the vacuum until the pad has cooled below steam generating temperature.

3. The method of making a sheet of lumber from damp ligno-cellulosic fibers, comprising laying down the fibers to form a porous pad, placing the pad in an atmosphere of high temperature steam under pressure to effect immediate and complete penetration of the pad by the steam and the heat plasticizing of its fibers, compressing the pad, while subjected to said steam, between press platens to effect the coalescing of its fibers, and venting from at least one surface of the pad, steam that is generated in the pad, removing the atmosphere of high temperature steam and subjecting the compressed pad to vacuum while still under pressure to cause quick flashing of moisture therein into steam and continuing the vacuum until the pad is cooled below steam generating temperature.

4. The method of making a board from ligno-cellulosic fibers which comprises laying down fibers of about 16% moisture content to form a porous pad, enclosing the pad in a chamber, admitting high pressure steam at approximately 350° F. to the chamber to effect complete penetration of the pad and the steam plasticizing of its fibers, compressing the pad between press platens while venting steam from at least one surface of the pad, removing the steam pressure from the chamber, and applying vacuum to the chamber and pad to flash remaining moisture in the pad into steam and to cool the pad below steam generating temperature, then releasing the pad from the platen pressure.

5. The method as recited in claim 4 wherein the press platens are heated within a range of 220° F. to 550° F., and compressing pressure is within a range of 100 to 1000 pounds per square inch.

6. The method of manufacturing sheet products from a mixture of fibrous material and a heat setting thermo-plastic bonding agent, comprising forming a porous pad of said materials, enclosing the pad in a pressing chamber, applying high temperature steam to the chamber under pressure to effect the penetration and heating of the pad thereby, compressing the heated pad between press platens, while subjected to the heat of high pressure steam, then subjecting the pad to vacuum while retained under platen pressure to effect quick cooling and setting of the bonding agent.

WORTH C. GOSS.

REFERENCES CITED

The following references are of record in the file of this patent:

UNITED STATES PATENTS

| Number | Name | Date |
|---|---|---|
| Re. 14,603 | Roberts | Mar. 4, 1919 |
| 1,742,410 | Millington | Jan. 7, 1930 |
| 2,036,156 | Lundback | Mar. 31, 1936 |
| 2,181,695 | Given | Nov. 28, 1939 |
| 2,218,897 | Skutl | Oct. 22, 1940 |
| 2,251,243 | Randall | July 29, 1941 |
| 2,348,081 | Linzell | May 2, 1944 |